United States Patent
Achkir et al.

(10) Patent No.: US 11,907,985 B2
(45) Date of Patent: *Feb. 20, 2024

(54) NETWORK, METHOD, AND NON-TRANSITORY COMPUTER-READABLE MEDIUM FOR CERTIFICATION OF VENDORS USING DISTRIBUTED LEDGER TECHNOLOGY

(71) Applicant: Cisco Technology, Inc., San Jose, CA (US)

(72) Inventors: D. Brice Achkir, Livermore, CA (US); Pavan Mettu, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/934,380

(22) Filed: Sep. 22, 2022

(65) Prior Publication Data
US 2023/0084634 A1    Mar. 16, 2023

Related U.S. Application Data

(63) Continuation of application No. 16/533,458, filed on Aug. 6, 2019, now Pat. No. 11,501,347.

(51) Int. Cl.
*G06Q 30/00* (2023.01)
*G06Q 30/0601* (2023.01)
*G06K 7/14* (2006.01)

(52) U.S. Cl.
CPC ....... *G06Q 30/0609* (2013.01); *G06K 7/1413* (2013.01); *G06Q 30/0625* (2013.01); *G06Q 30/0641* (2013.01)

(58) Field of Classification Search
None
See application file for complete search history.

(56) References Cited

U.S. PATENT DOCUMENTS 7,424,457 B2    9/2008   Khaishgi et al.
9,849,364 B2   12/2017   Tran et al.
(Continued)

OTHER PUBLICATIONS

Naidu, Vishal, A Fully Observable Supply Chain Management System Using Block Chain and IOT, Apr. 1, 2018, 2018 3rd International Conference for Convergence in Technology (I2CT), pp. 1-4 (Year: 2018).*

*Primary Examiner* — Allison G Wood
*Assistant Examiner* — Timothy J Kang
(74) *Attorney, Agent, or Firm* — Polsinelli P.C.

(57) ABSTRACT

The present technology pertains to a distributed server system for verifying vendors. The distributed server system comprises one or more nodes on a distributed network; a communication interface of a first node that communicates over a communication network with the one or more nodes on the distributed network, wherein the communication interface receives information about a unique seal associated with a product in response to a query; and a processor of the first node that executes instructions stored in memory, wherein execution of the instructions by the processor verifies that a vendor is associated with the unique seal has been appended to a distributed ledger, determines a match between the unique seal and the vendor; and, after determining the match, confirms that the vendor is a certified vendor of the product.

17 Claims, 8 Drawing Sheets

(56) References Cited

U.S. PATENT DOCUMENTS

| | | |
|---|---|---|
| 2002/0007322 A1 | 1/2002 | Stromberg |
| 2008/0154742 A1 | 6/2008 | Tebeau et al. |
| 2016/0098723 A1 | 4/2016 | Feeney |
| 2017/0372392 A1 | 12/2017 | Metnick et al. |
| 2019/0173667 A1 | 6/2019 | Wang et al. |
| 2019/0236605 A1 | 8/2019 | McHale et al. |
| 2019/0340623 A1* | 11/2019 | Rivkind .................. H04L 9/50 |
| 2020/0134139 A1* | 4/2020 | Vaish ................ G06F 16/1805 |

* cited by examiner

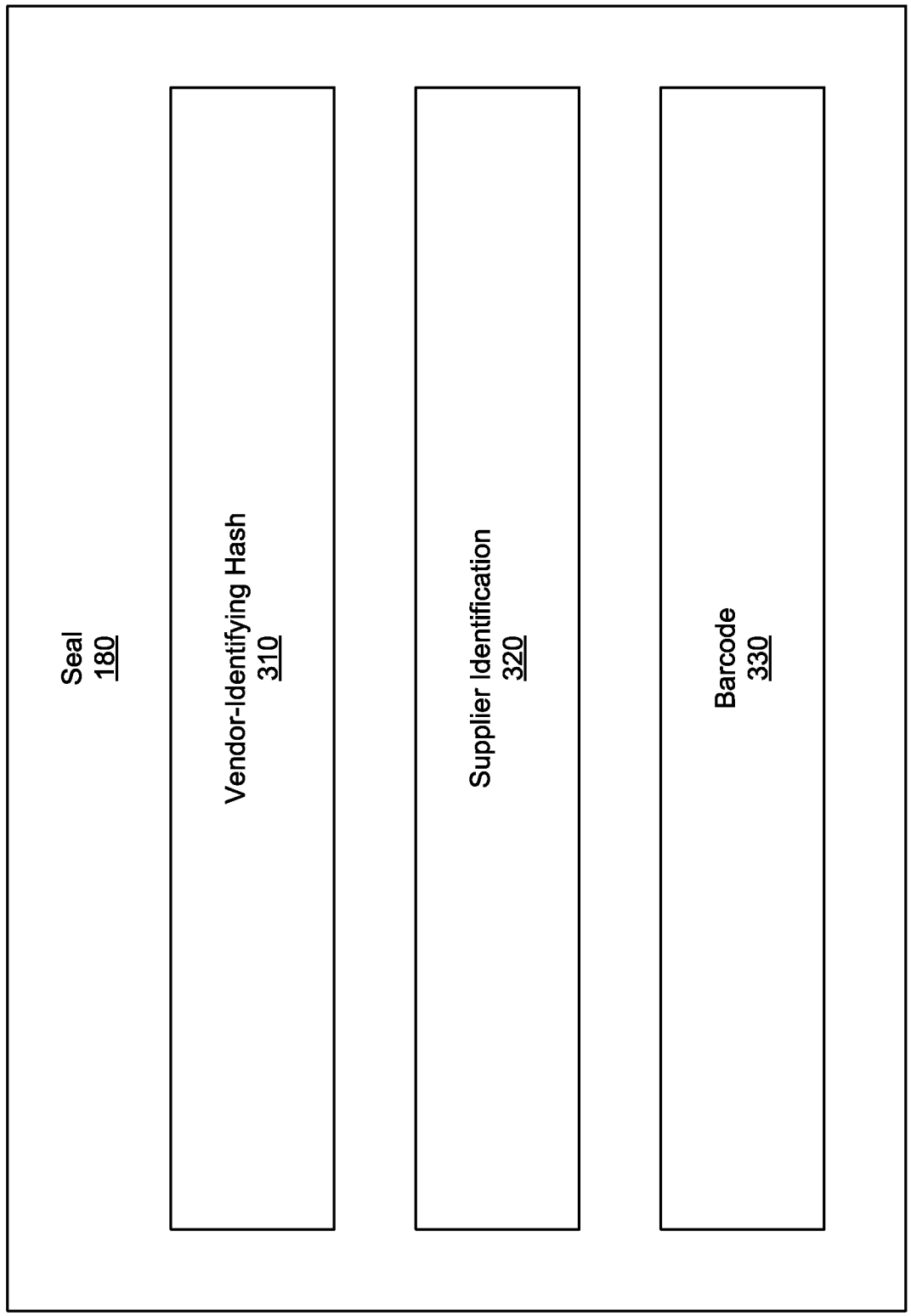

FIG. 4A

NETWORK, METHOD, AND NON-TRANSITORY COMPUTER-READABLE MEDIUM FOR CERTIFICATION OF VENDORS USING DISTRIBUTED LEDGER TECHNOLOGY

CROSS-REFERENCE TO RELATED APPLICATIONS

This application is a continuation of U.S. patent application Ser. No. 16/533,458, filed on Aug. 6, 2019, entitled "CERTIFICATION OF VENDORS USING DISTRIBUTED LEDGER TECHNOLOGY," the content of which is incorporated herein by reference in its entirety.

TECHNICAL FIELD

The present technology pertains to a distributed server system for verifying vendors, and more specifically to a distributed ledger which records transactions of a product as it moves through the market.

BACKGROUND

The rise of the Internet has seen with it a mass market of peer-to-peer marketplaces. eBay, Craigslist, and other sites are known for providing users a platform to sell new and used goods. However, customers in these marketplaces have uncertainty that these products come from reputable vendors or even that the advertised product matches the actual product.

Many companies will honor agreements whereby systems and products can be repaired or replaced for a given period of time (or in some cases indefinitely—e.g., lifetime guarantees). However, it is difficult to keep track of every end user, especially since products may be resold or sold as counterfeit. Some companies, moreover, sell most of its products not to the end user, but through distribution channels (e.g., in some companies, more than 80% of products are sold this way). The distribution channels can be spread globally throughout numerous vendors.

This provides an opportunity for counterfeiters to pass knockoff products as original products. These knockoffs can be returned to the original companies to be serviced, resulting in revenue loss and lower quality products to the end user. Currently, there is no way for a company, end user, or any entity within the supply chain to confirm whether the product is an authentic product.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 3A illustrates an exemplary configuration of an aspect of the present technology;

FIGS. 4A-4B illustrate some embodiments of an aspect of the present technology;

DESCRIPTION OF EXAMPLE EMBODIMENTS

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

The present technology pertains to a distributed server system for verifying vendors. The distributed server system comprises one or more nodes on a distributed network. It includes a communication interface of a first node that communicates over a communication network with the one or more nodes on the distributed network, wherein the communication interface receives information about a unique seal associated with a product in response to a query. A processor of the first node executes instructions stored in memory, wherein execution of the instructions by the processor verifies that a vendor associated with the unique seal has been appended to a distributed ledger. The system then determines a match between the unique seal and the vendor and, after determining the match, confirms that the vendor is a certified vendor of the product.

Example Embodiments

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art for verifying products sold by third-party vendors. The proliferation of resellers or distributors/vendors within the supply chain, both brick-and-mortar stores and online markets like eBay and Craigslist, allows customers to purchase items from companies who are not the item suppliers. Moreover, in online settings, these purchases can be made sight unseen. While existing mechanisms like seller reviews can impart some confidence to customers in their purchases, there is currently no verification process to confirm that 1) the product advertised matches the product offered, and 2) the vendor is a partner or certified reseller of the original manufacturer's product. The present technology aims to solve these issues through use of a distributed server system which verifies transactions over the lifetime of a product.

Figure 1:
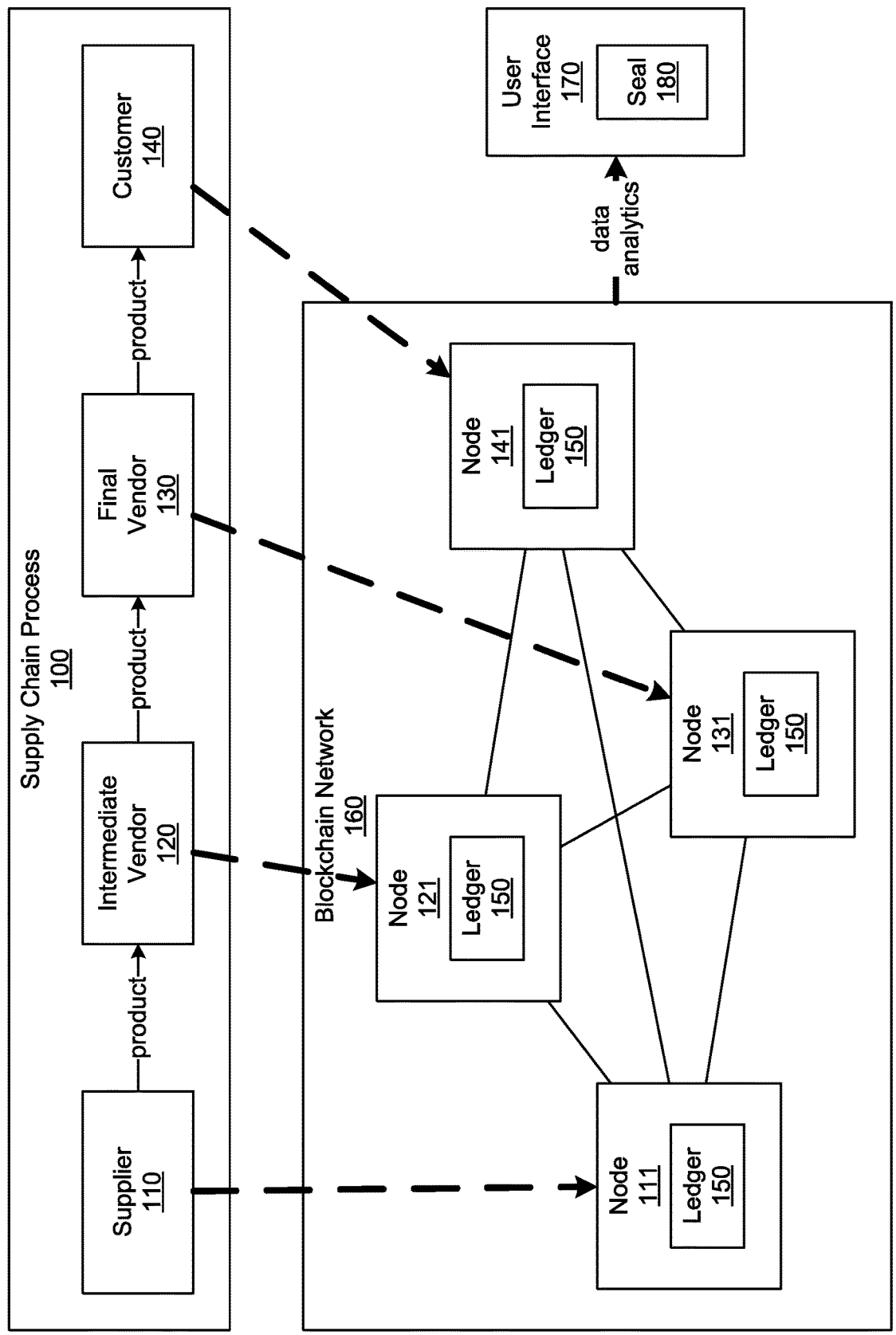
FIG. 1 illustrates an exemplary configuration of devices and a network in accordance with some aspects of the present technology.

FIG. 1 illustrates an example system in accordance with the present technology. Various nodes are configured to maintain a distributed network, such as, for example, a blockchain. Node 141, which is associated with a Customer 140 within the supply chain process 100, is one of many nodes within the distributed network, Blockchain Network 160. Blockchain Network 160 can include any number of nodes corresponding to suppliers (e.g., vendor, plant, etc. involved with component construction, assembly, merging of components, etc.), vendors/partners (e.g., distributors, shippers, retailers, third party logistics providers, etc.), and customers that have been enabled as nodes on Blockchain Network 160, such as Supplier 110 associated with Node 111, Intermediate Vendor 120 associated with node 121, Final Vendor 130 associated with Node 131, to the end Customer 140 associated with node 141. The Supply Chain Process 100 represented from the beginning (e.g., Supplier 110) to the current end Customer 140 has nodes within Blockchain Network 160 that provide a record of transactions associated with the product on a real time or near real time basis. Each node on system 100—including all suppliers, vendors, and customers—include a copy of Ledger 150 including all transactions associated with the product. Ledger 150 has been duplicated across all the nodes.

Blockchain Network 160 can guarantee that as a product moves from one node to another, the product (even a resold product) is original and backed by specific enterprises, vendors, suppliers, and/or partners. In some embodiments, Blockchain Network 160 can (1) certify the product, and (2) certify the supplier/vendor that supplied the product. As a result, since Blockchain Network 160 is distributed across many nodes, no one point of failure can provide a false certification. For example, Supply Chain Process 100 represents the movement of a product from Supplier 110 to Intermediate Vendor 120 to Final Vendor 130 to Customer 140. Movement along Supply Chain Process 100 can be due to a sale of the product, shipping of the product, or some other method. As the product moves through Supply Chain Process 100, each of Supplier 110, Intermediate Vendor 120, Final Vendor 130, and Customer 140 appends transaction information to Ledger 150 in Blockchain Network 160.

Supplier 110 can be the manufacturer, creator, producer, or owner of the product. Supplier 110 applies Seal 180 to the product for transaction tracking on Ledger 150 in Blockchain Network 160. In some embodiments, Supplier 110 can be an organization licensed to distribute the product under its own name.

Supplier 110 has an interest in ensuring Customer 140, and potentially other members of Supply Chain 100, have access to a verified transaction history of the product. In some embodiments, this can be because Supplier 110's business model is based on strong customer service. In some embodiments, Supplier 110 can offer product warranties that depend on the history of the product. For instance, Supplier 110 may only offer product support if the product is sold by a certified partner of Supplier 110. In these cases, Customer 140 needs access to the product history in order to fully evaluate the value of the product.

In some embodiments, Intermediate Vendor 120, Final Vendor 130, and Customer 140 can fulfill the role of a customer as the product moves through Supply Chain Process 100. In some embodiments, Intermediate Vendor 120 and Final Vendor 130 are subsidiaries or arms of Supplier 110, in which case Customer 140 serves as the only independent customer of the product.

Blockchain Network 160 can be a distributed server system running an instance of blockchain technology manifested in Ledger 150. It is responsible for tracking the status of the product attached with Seal 180 by recording its transactions through Supply Chain Process 100. In some embodiments, Blockchain Network 160 can be administered by Supplier 110. For instance, a company with strict standards for refurbished products could own and administer Blockchain Network 160 for selling and reselling its merchandise. In some embodiments, Blockchain Network 160 can be owned and administered by a third party who licenses the technology to Supplier 110. For instance, a hardware supplier could hire an enterprise specializing in blockchain technology to implement and administer the infrastructure for Blockchain Network 160.

Ledger 150 is a blockchain ledger which stores the transaction history of the product. Each time the product changes hands in Supply Chain Process 100, a new block is added to Ledger 150 to record relevant information about the product and the transaction. Detail on the contents of Ledger 150 is further described in relation to FIG. 2.

In some embodiments, when a block corresponding to a transaction is added to Ledger 150 on one of Nodes 111, 121, 131, or 141, it needs to be verified before it is added to all copies of Ledger 150. In some embodiments, a node associated with a member of Supply Chain 100 can be a trusted node. For example, Node 111 could be a trusted node as it is associated with Supplier 110. In these embodiments, only nodes that have the ability to write to Ledger 150 would be trusted nodes, and Ledger 150 can verify that a product hasn't deviated from trusted vendors, since there should be an unbroken chain leading back to Supplier 110. In some embodiments, there could be a mix of trusted and untrusted nodes, where consensus among nodes is needed before a block can be appended to Ledger 150. The consensus process can be the product of an agreement between a subset of nodes constituting a certain percentage of the total number of nodes, where all nodes in the subset agree that the block can be added to Ledger 150. The subset of nodes may need to comprise a minimum number of nodes to agree (e.g., have quorum) in order to append to Ledger 150. In some embodiments, a vendor can only be authenticated once, and if more than one node tries to authenticate as the vendor, the node will be flagged as a fraudulent user and will have to work with Supplier 110 or whoever manages the Blockchain Network 160 offline to get itself validated.

Without loss of generality and subject to verification, when Ledger 150 is updated by Supplier 110 on Node 111, Ledger 150 on Node 121, Node 131, and Node 141 is subsequently updated so that all copies of Ledger 150 are in concurrence on the history of the product.

In some embodiments, User Interface 170 can receive data visuals and analytics from Blockchain Network 160 and presents them to the user. The data analytics received by and displayed in User Interface 170 can vary by embodiment. In some embodiments, the data analytics can show the history of transactions during the lifetime of the product. In some embodiments, the data analytics can offer detailed information about the product or information about similar products with similar histories. For example, if the product is a network device, the data analytics could include configuration information, specifications related to the product, power consumption over time, etc. Or if the product is a vehicle, the data analytics could include information on the vehicle's condition, including average miles per gallon, 2-wheel/4-wheel/all-wheel drive, miles driven, condition of tires, etc. It could also offer information on recent sales of similar network devices, vehicles, etc. to provide added value to the customer.

Figure 2:
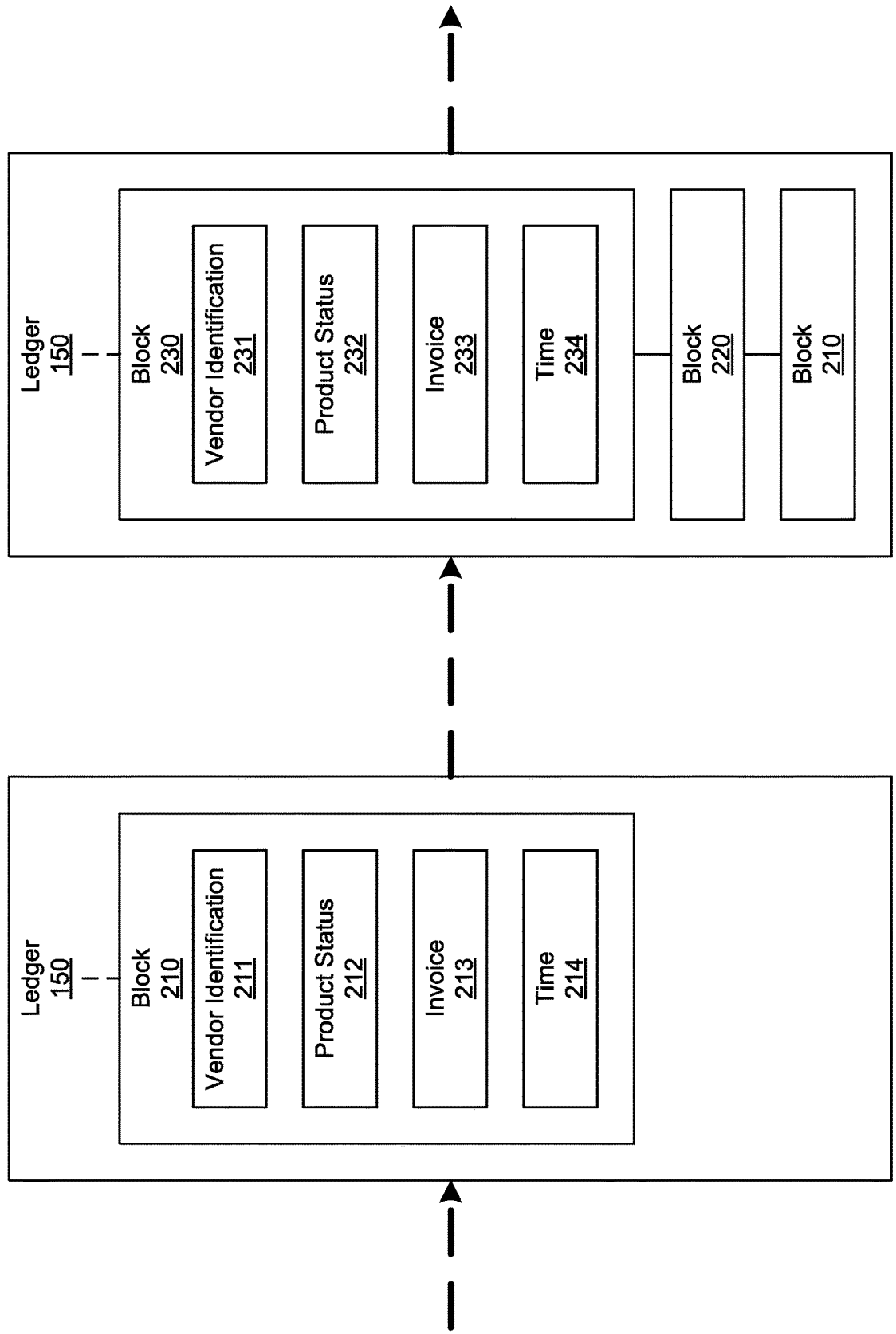
FIG. 2 illustrates an exemplary configuration of an aspect of the present technology.

FIG. 2 shows an example diagram of Ledger 150, a blockchain ledger which records information pertinent to the product moving through Supply Chain Process 100. The left-hand instance of Ledger 150 shows the ledger at some time $t_1$ with Block 210 being added to Ledger 150. The right-hand instance of Ledger 150 shows the ledger at some time $t_2$ after $t_1$. At $t_2$, Block 220, in addition to Block 210, has already been added to Ledger 150, and Block 230 is being added.

Ledger 150 contains blocks which are logged by one of Supplier 110, Intermediate Vendor 120, Final Vender 130, and/or Customer 140 through the unique seal placed on the product. Block 210, Block 220, and Block 230 are all example blocks containing information for different transactions.

Block 230 is appended (e.g., linked) to Block 220, which in turn is appended to Block 210, according to the rules of blockchain technology. Collectively, the blocks on Ledger 150 provide a cryptographically secure temporally ordered record of all transactions recorded on Ledger 150. In some embodiments, one or more blocks may be added to Ledger 150 at a given time.

As with all blocks on Ledger 150, Block 210 contains relevant information about the transaction taking place, including Vendor Identification 211, Product Status 212, Invoice 213, and Time 214.

When the product comes into possession of a new vendor, Ledger 150 is appended with a block containing relevant information when the unique seal is scanned (in this instance the unique seal is placed on the product) or otherwise entered into the system through the vendor's node. For instance, Block 230 could be added because Intermediate Vendor 120 sold the product to Final Vendor 130. In this case, Node 131 updates Ledger 150 with Block 230 based on receipt of the unique seal. Vendor Identification 231 can identify Final Vendor 130 as the new vendor of the product. Product Status 232 can display relevant product information, such as original manufacture date, condition, warranty, etc. Invoice 233 can display the cost of the product as well as information regarding Intermediate Vendor 120. Time 234 can display the date and time at which the transaction takes place.

Figure 3B:
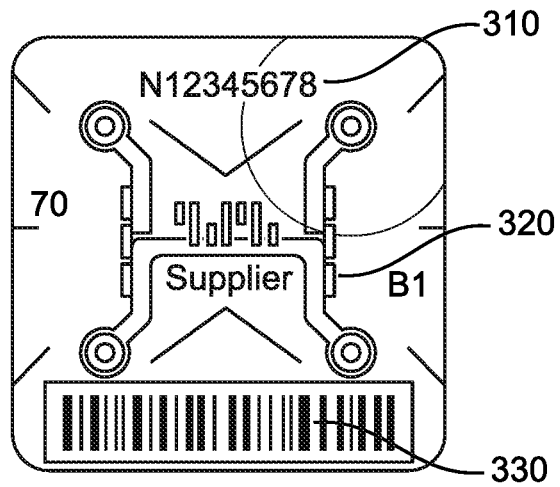
FIGS. 3B-3C illustrate some embodiments of the aspect of the present technology shown in FIG. 3A.

FIG. 3A illustrates an example aspect of the present technology. Seal 180 can, for example, be a physical seal applied to the product moving through Supply Chain Process 100. It contains information identifying the vendor of the product (Vendor-Identifying Hash 310), the supplier of the product (Supplier Identification 320), and a standard product barcode (Barcode 330). Examples of the aspect described in FIG. 3A can be seen in FIGS. 3B-3C.

Figure 3C:
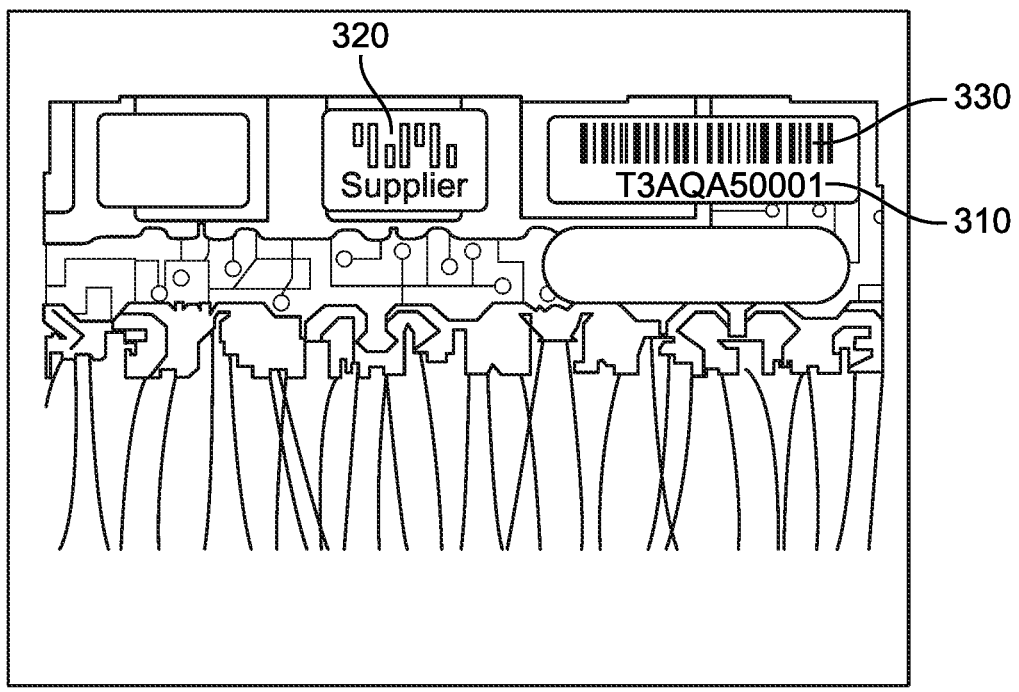

Vendor-Identifying Hash 310 can be present on a digital and/or physical Seal 180, depending on embodiments. On a digital Seal 180, Customer 140 can click on Vendor-Identifying Hash 310 to access information about Final Vendor 130, such as a webpage showing its status as a certified reseller of products produced by Supplier 110. On a physical Seal 180, such as shown in FIGS. 3B and 3C, Vendor-Identifying Hash 310 may identify one or multiple vendors, such as Intermediate Vendor 120, and/or Final Vendor 130.

Figure 4A:
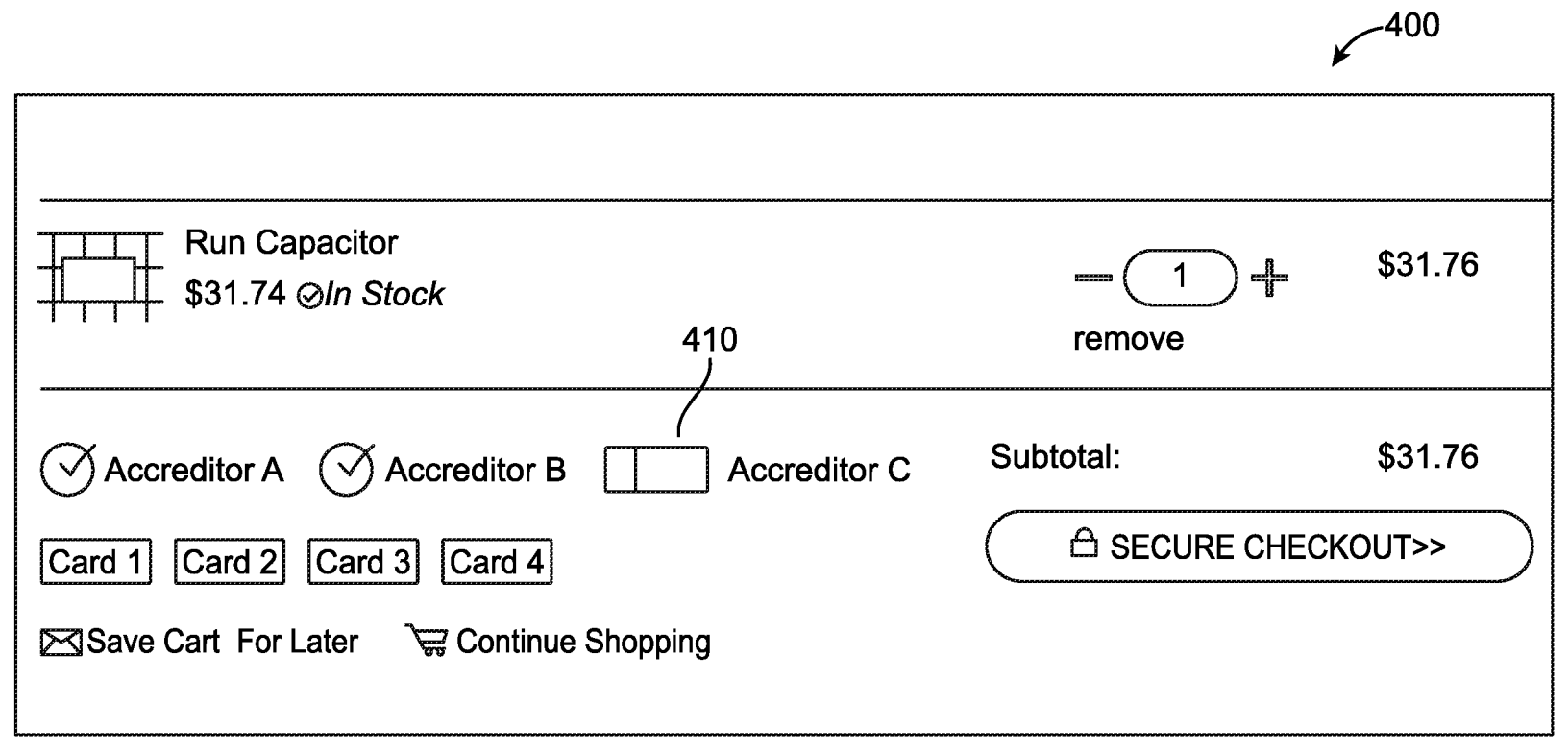
Figure 4B:
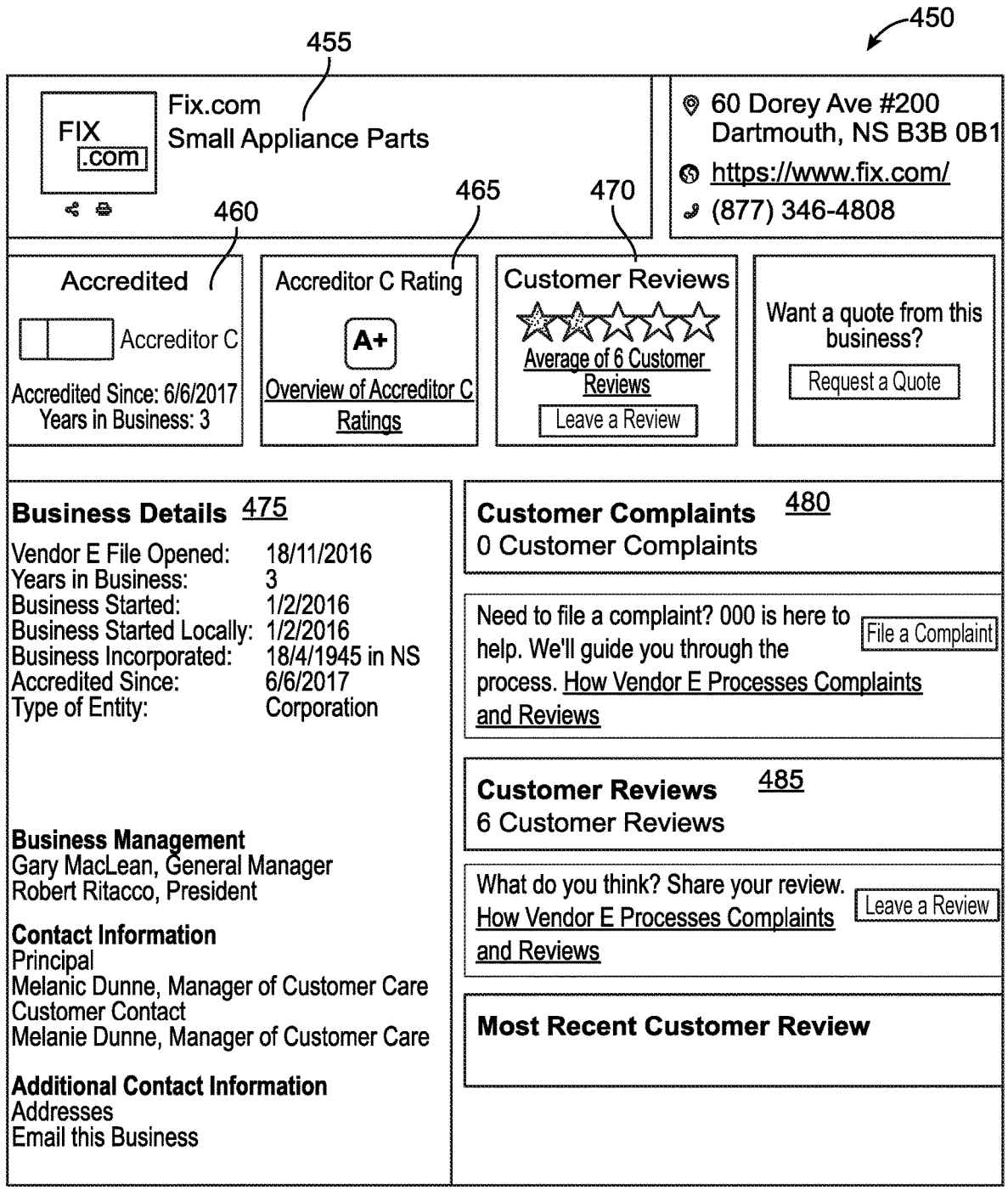

Supplier Identification 320 can be any supplier-identifying marking associated with Supplier 110, such as a company name, logo, or slogan. For a digital Seal 180, clicking Supplier Identification 320 can route Customer 140 to a company-hosted page, which can feature information about the product, the company, or information taken from the transaction history available on Ledger 150. For example, FIGS. 4A-4B illustrate some embodiments of the digital Seal 180. The figures moreover show examples of ways in which vendors can advertise their certification (such as by Supplier 110).

FIG. 4A illustrates a checkout screen 400 provided by Final Vendor 130 where Customer 140 can purchase a product. In addition to providing a standard checkout interface, Accreditation 410 provides a link to an accreditor, Accreditor C. The accreditor could be any of Supplier 110, Intermediate Vendor 120, or another third party organization that specializes in certification. While Accreditation 410 provides accreditation by Accreditor C, in some embodiments there can also be accreditations by Accreditor A and Accreditor B. These could be prior vendors in Supply Chain 110, or independent accreditation agencies.

FIG. 4B illustrates an example Overview 450 linked to by Certification 410 and displayed on User Interface 170, in accordance with some embodiments. The information displayed in Overview 450 includes the vendor name and address (455), accreditor (460), accreditor rating (465), average customer rating (470), business details (475), customer complaints (480), and customer reviews (485).

Figure 5:
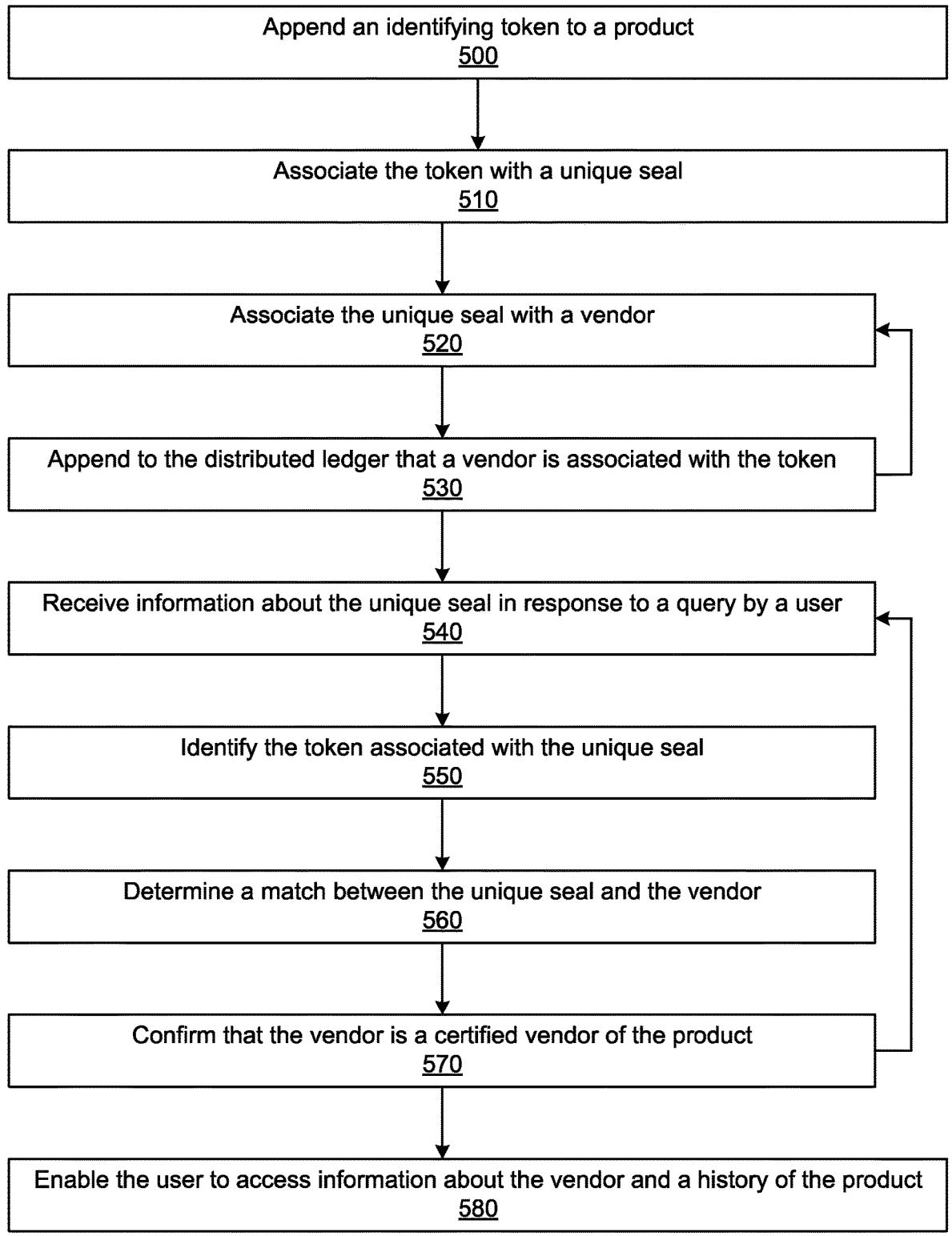
FIG. 5 illustrates an example method embodiment in accordance with some aspects of the present technology.

FIG. 5 illustrates an example method embodiment in accordance with some aspects of the present technology. At the outset of the method, Supplier 110 appends (500) an identifying token to a product to be sold. This can be a product manufactured, licensed, or merely distributed by Supplier 100. Once the token and the product are matched, a physical or digital unique Seal 180 is associated (510) with the token. In this way, Seal 180 becomes associated with the product via the identifying token. For example, a network device could include a serial number. This serial number could be included in Seal 180 which is attached to the network device.

When the product is sold, as from Supplier 110 to Intermediate Vendor 120, the unique Seal 180 becomes associated (520) with Intermediate Vendor 120. This information is then appended (530) as a block on Ledger 150. This block can contain relevant transaction information, including the identity of the new vendor, the product status, a transaction invoice, and the time of transaction. For more detail on Ledger 150, see FIG. 2.

The block appended to Ledger 150 can occur on a copy of Ledger 150 on Node 121 associated with Intermediate Vendor 120. Once appended to Ledger 150, Blockchain Network 160 can either accept or reject the appended block. If accepted, the appended block will be added to Nodes 111, 131, and 141, and thus exist on every copy of Ledger 150 across the distributed system.

A digital Seal 180 can constantly update Vendor-Identifying Hash 310 to correspond to the current vendor of the product. A physical Seal 180 will either need to have Vendor-Identifying Hash manually replaced for each new vendor, or it will correspond to only one vendor of the product. For example, Vendor-Identifying Hash 310 could identify Final Vendor 130 as it is the vendor which ultimately sells the product to the end user, Customer 140.

To inquire about a product, Customer 140 can request (540) for and receive information embedded in or linked to Seal 180. To determine that Final Vendor 130 is a verified seller of the product and has a verified transaction history on Ledger 150, the token associated with Seal 180 is identified (550) on Ledger 150 in a chain of blocks. The method further aims to determine (560) a match between Seal 180 and Final Vendor 130 in this chain of blocks. If Final Vendor 130 is found on one of the blocks, say in Vendor Identification 231 on Block 230, then the method confirms (570) that Final Vendor 130 is a certified vendor of the product.

Finally, Customer 140 can be enabled (580) to access information from Ledger 150 about the product, Final Vendor 130, or product history, via User Interface 170.

Figure 6:
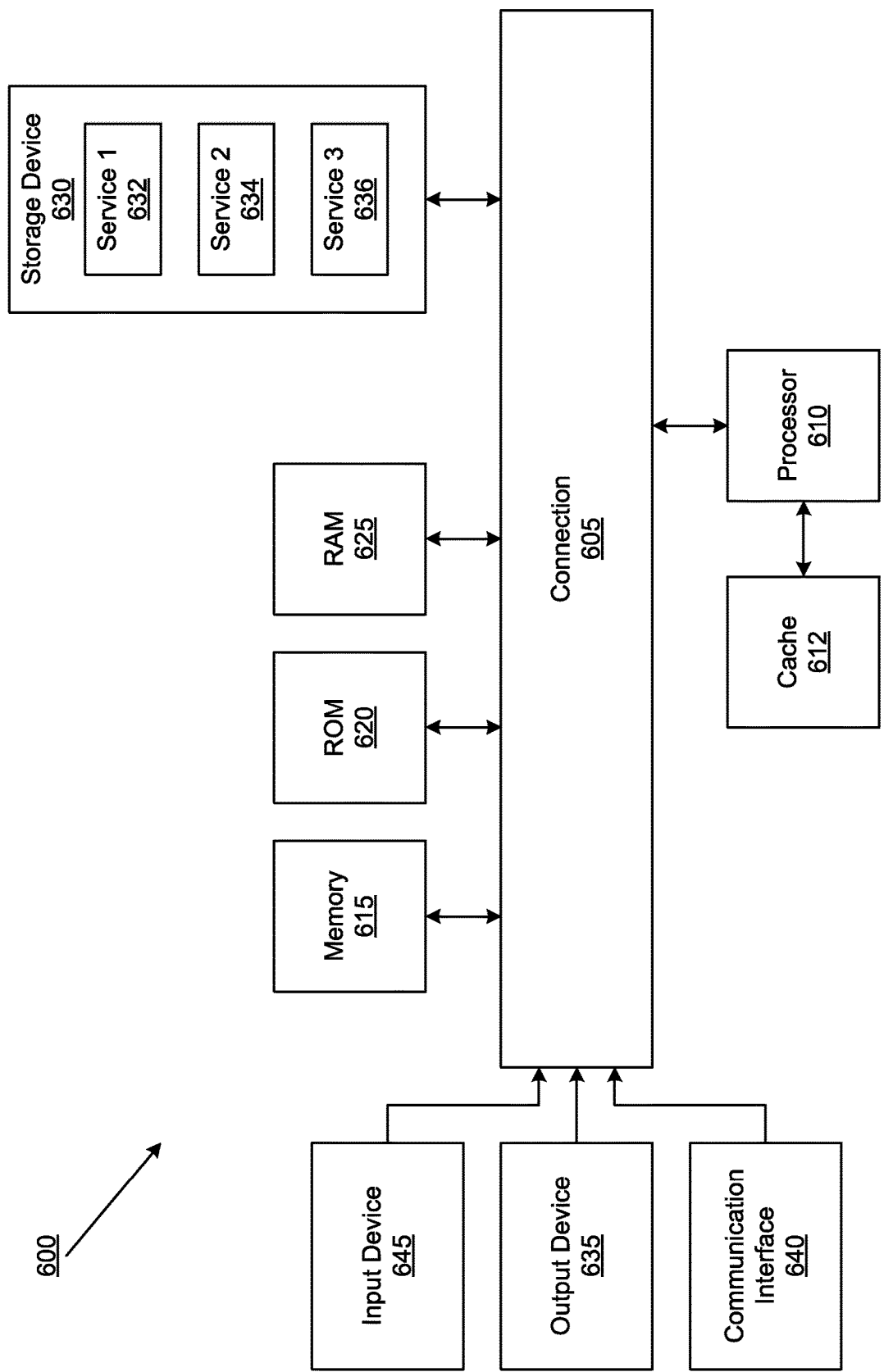
FIG. 6 illustrates an example system configuration in accordance with some aspects of the present technology.

FIG. 6 shows an example of computing system 600, which can be for example any computing device making up Nodes 111, 121, 131, or 141, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments computing system 600 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor (or any form of processing intelligence) and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A distributed network comprising:
   a first node on the distributed network communicatively coupled to one or more additional nodes on the distributed network, the first node configured to:
   receive information about a unique seal associated with a product in response to a query;
   verify that (1) a block including information on a vendor associated with the unique seal has been appended to a distributed ledger by a trusted node, wherein the trusted node is one of the one or more additional nodes on the distributed network, and (2) the vendor is a certified vendor of the product to yield a verification, wherein the unique seal is uniquely associated with each of a plurality of vendors at different times based on movement of the product amongst the plurality of vendors through a supply chain; and
   record the verification on the distributed network by updating the block to reflect the verification, wherein the block reflecting the verification is added to all nodes of the distributed network.

2. The distributed network of claim 1, wherein the unique seal is updated when the product moves from one of the plurality of vendors to a next one of the plurality of vendors.

3. The distributed network of claim 1, wherein the first node is configured to confirm that the vendor is a certified vendor based on matching the vendor with the unique seal.

4. The distributed network of claim 1, the unique seal identifies a token associated with the unique seal, the token being a unique identifier that has been appended to the distributed ledger across a plurality of nodes of the distributed ledger.

5. The distributed network of claim 1, wherein the unique seal is associated with resale of a product and is received from one of (1) scanning a barcode on the product or (2) an input at a clickable link associated with the product on a website.

6. The distributed network of claim 1, wherein the first node is further configured to, after verifying the vendor, enable a user access to information about the vendor and a history of the product.

7. A method of verifying vendors, comprising:
   receiving, at a first node on a distributed network communicatively coupled to one or more additional nodes on the distributed network, information about a unique seal associated with a product in response to a query;
   verifying that (1) a block including information on a vendor associated with the unique seal has been appended to a distributed ledger by a trusted node, wherein the trusted node is one of the one or more additional nodes on the distributed network, and (2) the vendor is a certified vendor of the product to yield a verification, wherein the unique seal is uniquely associated with each of a plurality of vendors at different times based on movement of the product amongst the plurality of vendors through a supply chain; and
   recording the verification on the distributed network by updating the block to reflect the verification, wherein the block reflecting the verification is added to all nodes of the distributed network.

8. The method of claim 7, wherein the unique seal is updated when the product moves from one of the plurality of vendors to a next one of the plurality of vendors.

9. The method of claim 7, wherein the first node is configured to confirm that the vendor is a certified vendor based on matching the vendor with the unique seal.

10. The method of claim 7, the unique seal identifies a token associated with the unique seal, the token being a unique identifier that has been appended to the distributed ledger across a plurality of nodes of the distributed ledger.

11. The method of claim 7, wherein the unique seal is associated with resale of a product and is received from one of (1) scanning a barcode on the product or (2) an input at a clickable link associated with the product on a website.

12. The method of claim 7, further comprising:
   after verifying the vendor, enable a user access to information about the vendor and a history of the product.

13. One or more non-transitory computer-readable media comprising computer-readable instructions, which when executed by one or more processors at a first node of a distributed network, cause the first node to:
   receive information about a unique seal associated with a product in response to a query, wherein the first node is communicatively coupled to one or more additional nodes on the distributed network;
   verify that (1) a block including information on a vendor associated with the unique seal has been appended to a distributed ledger by a trusted node, wherein the trusted node is one of the one or more additional nodes on the distributed network, and (2) the vendor is a certified vendor of the product to yield a verification, wherein the unique seal is uniquely associated with each of a plurality of vendors at different times based on movement of the product amongst the plurality of vendors through a supply chain; and
   record the verification on the distributed network by updating the block to reflect the verification, wherein the block reflecting the verification is added to all nodes of the distributed network.

14. The one or more non-transitory computer-readable media of claim 13, wherein the unique seal is updated when the product moves from one of the plurality of vendors to a next one of the plurality of vendors.

15. The one or more non-transitory computer-readable media of claim 13, wherein the execution of the computer-readable instructions further cause the first node to confirm that the vendor is a certified vendor based on matching the vendor with the unique seal.

16. The one or more non-transitory computer-readable media of claim 13, the unique seal identifies a token associated with the unique seal, the token being a unique identifier that has been appended to the distributed ledger across a plurality of nodes of the distributed ledger.

17. The one or more non-transitory computer-readable media of claim 13, wherein the unique seal is associated with resale of a product and is received from one of (1) scanning a barcode on the product or (2) an input at a clickable link associated with the product on a website.

* * * * *